A. S. HUBBARD.
STORAGE BATTERY.
APPLICATION FILED DEC. 6, 1917.

1,363,648.

Patented Dec. 28, 1920.
2 SHEETS—SHEET 1.

Albert S. Hubbard
INVENTOR

BY Knight Bros.
his ATTORNEYS

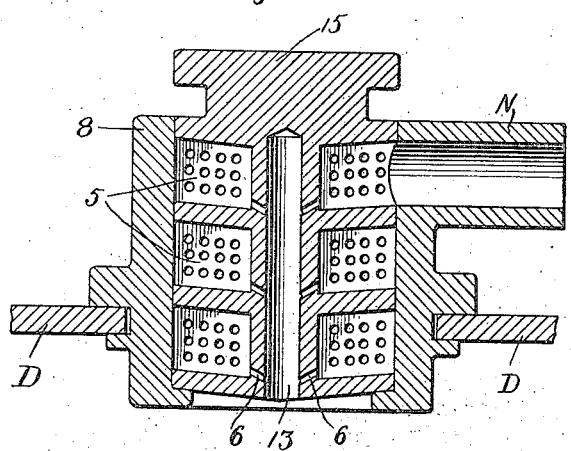
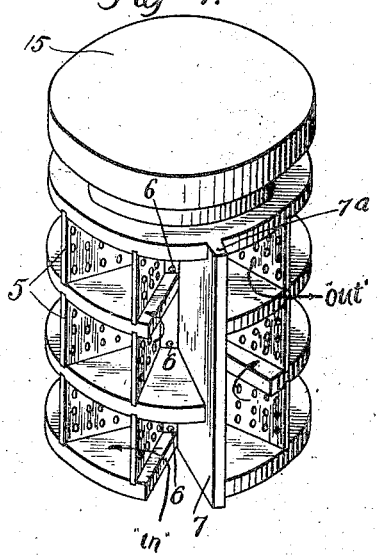
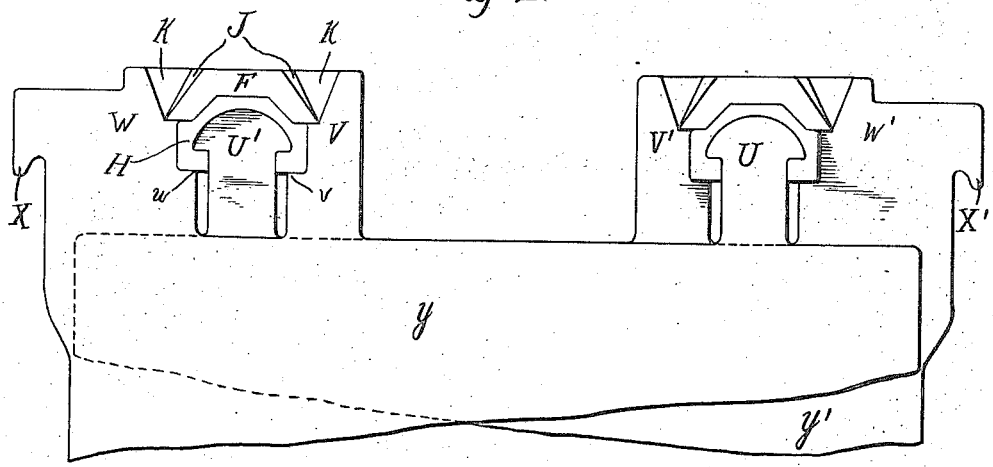

UNITED STATES PATENT OFFICE.

ALBERT S. HUBBARD, OF NEW YORK, N. Y., ASSIGNOR TO GOULD STORAGE BATTERY COMPANY, OF DEPEW, NEW YORK, A CORPORATION OF NEW YORK.

STORAGE BATTERY.

1,363,648.  Specification of Letters Patent.  Patented Dec. 28, 1920.

Application filed December 6, 1917. Serial No. 205,829.

*To all whom it may concern:*

Be it known that I, ALBERT S. HUBBARD, a citizen of the United States, and residing in the borough of Manhattan, city, county, and State of New York, have invented certain new and useful Improvements in Storage Batteries, of which the following is a specification.

This invention relates to improvements in the construction of storage batteries and in their ventilation and cooling, and is of advantage particularly in cases where the free escape of the gaseous products of the cells into the surrounding atmosphere should be avoided. The accompanying drawings illustrate the invention and form part of these specifications.

In the drawings,—

Fig. 2 shows in detail the support of the free plate ends; and

Figs. 3 and 4 show a longitudinal vertical section and a perspective view respectively of the exhaust device for the cell gases and the air.

Figure 1:
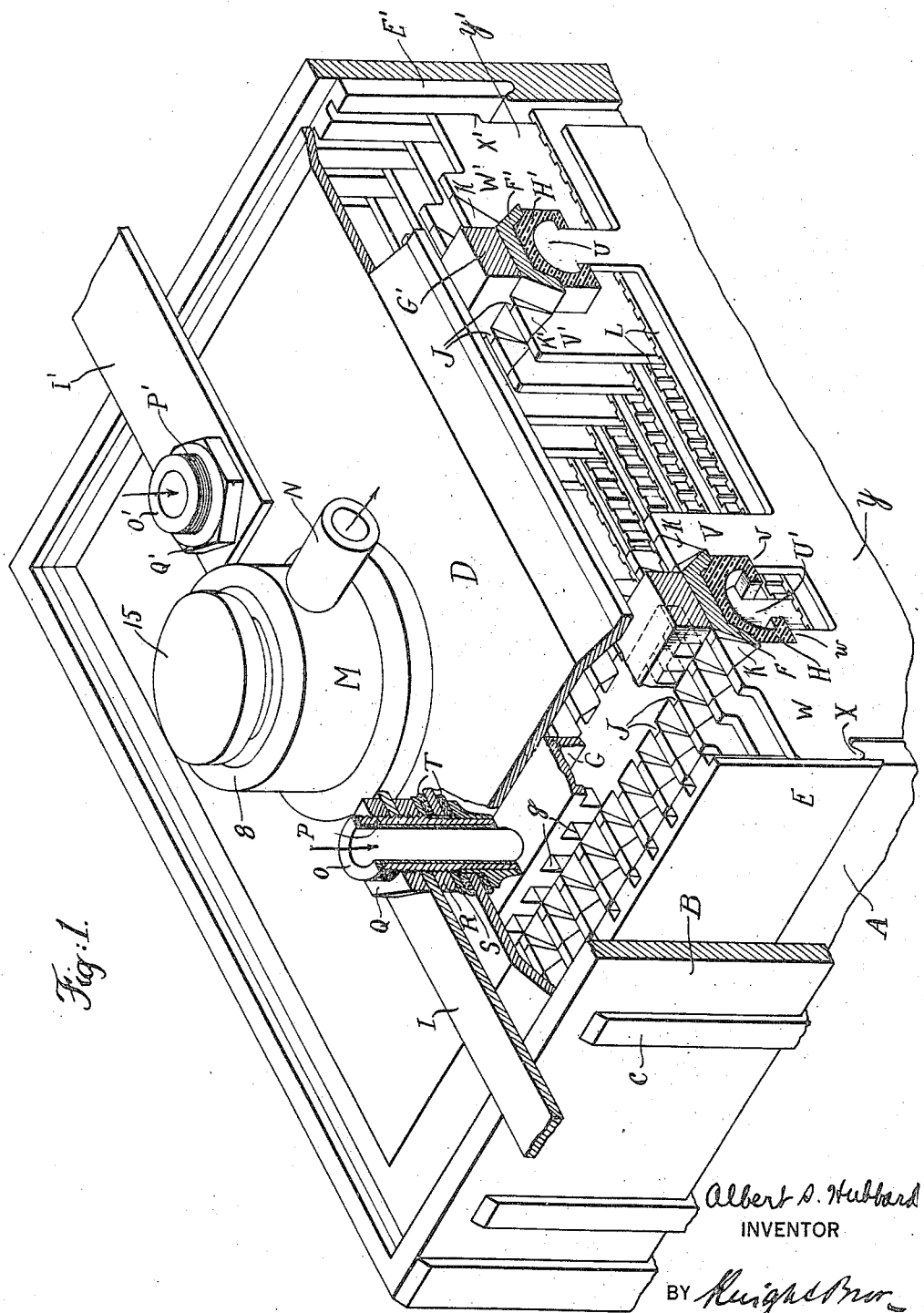
Figure 1 is a perspective view of a storage battery cell, the jar and some of the other parts being cut away in places to show the details of the interior construction.

In Fig. 1, A represents the jar, constructed preferably of hard rubber compound or other suitable material. The jar is shown reinforced with horizontal and vertical strengthening members B and C. Any suitable means known in this art may be employed for further reinforcing these members. The material of the strengthening members may be of a different composition or formula from that used in the jar walls.

The spacing of these strengthening members and their sizes will be determined by the materials used, the jar size and other conditions.

The inside dimensions of the jar relative to the size of the plates, their number and spacing will be such as to permit of the necessary clearances as well as the necessary sediment space beneath the plates and the desired electrolyte and air space above the plates.

D represents the cover, cut away in places to show the interior of the cell. The cover is preferably constructed of hard rubber compound or other acid proof insulating material. The cover may also be constructed of acid proof metal such as lead or antimony-lead alloy.

In case a metal cover is used, it will be necessary to insulate it from the terminal posts O and O' preferably by means of insulating bushings. The cover D is preferably provided with a depressed edge in which sealing compound can be poured—thus sealing the cover to the jar. The cover shown is of the hard rubber compound type.

E and E' are supporting pieces for the lugs X and X' on the outer ends of the conducting lugs W and W' of the plates Y and Y'. These supporting pieces have no insulating function and hence can be cast of lead or antimony lead alloy; to reduce the weight, however, I prefer to mold them of hard rubber compound. In case the supporting pieces E and E' and the cover D are both of metal, it will be necessary to provide insulation between the supporting pieces E and E' and the cover D. The bottoms of these supporting pieces are shown with downward extensions which, by interlocking with correspondingly channeled ledges formed by the receding jar walls, insure the maintenance of alinement of the plate elements and the jar. The extensions and corresponding ledges shown in curved form may be of any desired shape, so long as the lateral motion of the plate elements relative to the jar is thereby limited. These supporting pieces are slotted to take the outer ends X and X' of the plate lugs W and W' and each slot has at its bottom a depression forming a socket into which the corresponding projection X and X' extends, and by which it is fixed in position.

F and F' represent respectively the negative and positive bus bars. These bus bars are preferably made of the same material as the plate lugs or terminal ends W and W' and V and V', since a better joint is thereby obtained when the bus bars and plate lugs are joined by lead burning. The bus bars are provided with projections J and J' to insure alinement of the plates relative to the bus bars and to facilitate the lead burning operation.

The parts K and K' represent those parts filled in by lead burning to unite the plate lugs with the bus bars.

G and G' represent air ducts to conduct the incoming air of the ventilating system and to distribute it to each side of the jar center. These air ducts may be made of the same material as the bus bars F and F' and may be made as part of the bus bars or they may be constructed of any desired acid proof material such as hard rubber or glass. These ducts contain an interior channel with vent openings $g$ in the side wall farthest from the center of the cell, so that air entering the cell through the hollow terminal posts O and O' due to the suction produced at the exhaust N, to be referred to presently, by means of an exhaust blower or pump, passes down through these posts into the air ducts G, G', thence out through the small openings $g$ down and between the lugs W and W' of adjacent plates and up to the central outlet M passing between the lugs V and V' on the way. The incoming air thus not only dilutes and vents the gases between each pair of plates, generated by the action of the battery, but also cools the terminals, the bus bars and the terminal lugs of the plates.

H and H' are beaded channel bars made of insulating material, which are inserted transversely to the plates beneath the bus bars F and F', and are supported by projections W and V respectively on the lugs W and W' and V and V', and in turn support in their respective channels the lugs U and U' of the adjacent plates, located near the free ends of the plates. By these means also vertical alinement is obtained of the plates of one polarity relative to those of the opposite polarity. Fig. 2 shows the function of bars H and H' more in detail.

The bars H and H' are preferably constructed of hard rubber compound although glass or other insulating material having the necessary strength may be used.

I and I' are the conductors, preferably of lead coated copper, provided to connect adjacent cells together.

L, L represent the separators here shown as of the grooved wood type. Before use these separators are preferably treated by immersion in a hot solution of caustic potash or caustic soda to remove substances liable to affect the plates. The separators shown are of the type usually employed with plates of the pasted type. The type of separator to be used is determined by the type of plates and the results desired.

P and P' represent a reinforcement of good conducting material such as copper or silver embedded in the lead or lead-antimony terminal posts O and O'. I have shown the parts P and P' as projecting to the outside of terminal posts O and O' and externally threaded to correspond to the nuts Q and Q' and R and R' between which the connections I and I' are clamped. The reinforcement by good conducting material may be extended throughout the length of the bus bars F and F', if necessary, to obtain increased conductivity.

S and S' are washers of hard rubber compound or of acid proof metal or alloy.

T, T and T' are gaskets preferably made of soft rubber compound and designed to insure a gas-tight and liquid-tight joint between the terminal posts O and O' and the cover D. These gaskets in connection with the sealing compound provided at the outer edges of the cover D as mentioned before, render the cell gas-tight and liquid-tight except for the openings in O and O' and in N.

The preferred construction of the outlet vent M is shown in Figs. 3 and 4, of which Fig. 3 is a longitudinal sectional view and Fig. 4 a perspective view of its removable central portion 15. This central portion contains a number of tiers 9, 10, 11, each of which is divided radially into a number of segments by means of perforated baffle plates 5. A radial solid wall 7 extends through all tiers such that a passage-way for the exhaust gases is established as follows: from the point marked "In," following the arrow, through all baffles of tier 9, then following the arrow to the next higher tier 10, the reverse way through all baffles of that tier and thence up to tier 11, which the gases leave at the arrow marked "Out," where this tier is connected to the discharge nozzle N of casing 8 (Fig. 3). The purpose of perforated baffles 5 is to catch the spray carried by the escaping gases. The liquid thus collected in each compartment may return through drain holes 6, which terminate in a common central vertical well 13, as shown in Fig. 3, which latter discharges directly into the cell. When central member 15 is removed from casing 8, the interior of the cell can be conveniently inspected.

It is obvious, of course, that, instead of a plurality of tiers, a gas passage in the form of a continuous helix may be employed, in which similar vertical baffles and drains may be provided.

It is important that the central member 15, Fig. 4, be placed in the proper position when returned, hence the vertical wall 7 is provided with a projecting edge 7$^a$ which is designed to fit in a corresponding groove in casing 8 (not shown). The outer casing 8 (Fig. 3) of the outlet vent M is arranged to fasten to the cover D with a bayonet joint or its equivalent, so that, when attached to cover D, it always permits the outlet N to point in the proper direction. The central member 15 shown in Fig. 4 should have a close fit in its casing 8 to insure air-tightness.

Y represents the plates which are shown as of the pasted type, they may, however, be of either the Planté or pasted type or a combination with, for instance, Planté positives and pasted negatives.

I claim:

1. A storage battery of the character described, including a jar having an air tight cover and containing positive and negative plates, a hollow terminal stud connected to each set of plates and protruding through said cover for permitting the cooling of said studs and venting of the jar by means of said hollow studs.

2. In a storage battery of the character described, comprising a jar having an airtight cover and containing positive and negative plates, a hollow terminal stud connected to each set of plates and protruding through said cover, one stud being located on each side of the jar center to permit entry of venting air laterally of the jar center through said studs, and means located in said cover between said studs for permitting the withdrawal of gases and venting air.

3. A storage battery of the character described, including a jar having an air tight cover and containing a plate group provided with a hollow terminal stud protruding through said cover for permitting venting air to pass into the jar through said hollow stud and means located in said cover for permitting the withdrawal of gases and venting air.

4. In a storage battery of the character described, comprising a jar having an airtight cover and containing positive and negative plates, a hollow terminal stud connected to each set of plates and protruding through said cover, one stud being located on each side of the jar center, means for individually venting the interstitial spaces between adjacent plates by means of said hollow studs and means for permitting the withdrawal of generated gases and venting air through said cover.

5. In a storage battery of the character described, comprising a jar, having an airtight cover and containing positive and negative plates, a bus bar for each set of plates running transversely thereto, one bar being located on each side of the jar center, a hollow terminal stud attached to each bar, a venting duct superimposed upon each bar having at points above the interstitial plate spaces vent openings in its lateral wall, pointing away from the center of the jar, each duct communicating with the hollow stud of its bar, said studs protruding through the jar cover to permit admission of air to said interstitial spaces, and means located in said cover for permitting withdrawal of gases generated in the jar to produce a flow of air through said studs.

6. In a storage battery of the character described, comprising a jar containing positive and negative plates and means for admitting venting air to the upper portion of said jar, an exhaust element including a casing and a centrally located separator element containing an exhaust duct having spaced apart vertical perforated walls arranged in series.

7. In a storage battery of the character described, comprising a jar containing positive and negative plates and means for admitting venting air to the upper portion of said jar, an exhaust element including a casing and a centrally located separator element containing an exhaust duct having spaced apart vertical perforated walls arranged in successive superimposed series.

8. In a storage battery of the character described, comprising a jar having an airtight cover and containing positive and negative plates, means for admitting venting air to the upper portion of said jar, an exhaust element comprising a casing and a central element having a continuous exhaust duct, containing transverse perforated walls spaced apart at suitable intervals over the whole length of the duct, to form condensing chambers for spray tending to escape during the venting, and means for draining said chambers into the jar.

9. In a storage battery of the character described, comprising a jar containing positive and negative plates and means for admitting venting air to the upper portion of said jar, an exhaust element including a casing on a centrally located condenser containing an exhaust duct having spaced apart vertical perforated walls to form condensing chambers for spray tending to escape during venting and means for individually draining said chambers into the jar.

10. In a storage battery of the character described, comprising a jaw having an airtight cover and containing positive and negative plates, a hollow terminal stud connected to each set of plates and protruding through said cover for permitting the venting of the jar from said hollow studs, and an exhaust element located in said cover between said studs, comprising a casing and a removable central element having a continuous exhaust duct, containing transverse perforated walls spaced apart at suitable intervals to form condensing chambers for spray tending to escape during the venting, said chambers having individual drain holes and a common well connected to said drains for returning the condensate to the jar.

11. In a storage battery of the character described, comprising a jar having an airtight cover and containing positive and negative plates, a hollow terminal stud connected to each set of plates and protruding through said cover, one stud being located on each side of the jar center, means for individually venting the interstitial spaces between adjacent plates from said hollow studs, and an exhaust element located in said cover between said studs for permitting the withdrawal of gases and venting air, said element comprising a casing and a removable central element having a continuous exhaust duct containing transverse perforated walls spaced apart at suitable intervals to form condensing chambers for spray tending to escape during the venting, said chambers having individual drain holes and a common well connected to said drains for returning the condensate to the jar.

12. A storage battery having a ventilating passage comprising an air inlet, means for subdividing the passage from said inlet to the several spaces interstitial to the battery plates and means for exhausting the gases from the several interstitial spaces.

13. A storage battery having its terminal stud hollow for cooling it, an aperture in the center of the battery for drawing cooling air into the interior through said hollow stud and means attached to said stud in the interior of the battery for distributing the air entering through said stud to the interstitial spaces between the battery plates for venting the battery.

ALBERT S. HUBBARD.